Figure 1:
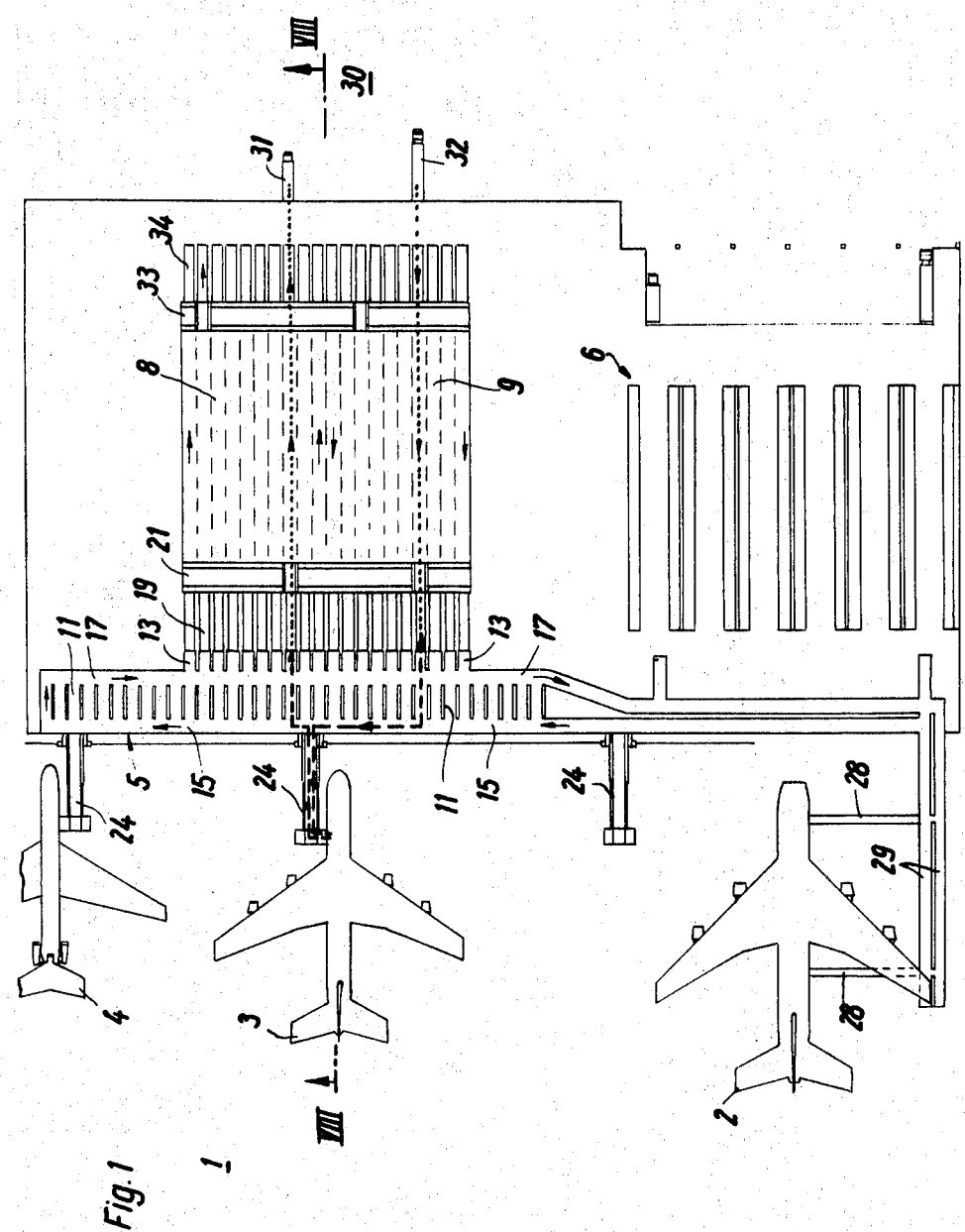

United States Patent

[11] 3,568,862

| [72] | Inventors | Klaus Walkhoff<br>Essen;<br>Uwe Lichtenford, Essen-Werden, Germany |
|---|---|---|
| [21] | Appl. No. | 845,190 |
| [22] | Filed | July 28, 1969 |
| [45] | Patented | Mar. 9, 1971 |
| [73] | Assignee | Fried. Krupp Gesellschaft mit beschrankter Haftung<br>Essen, Germany |
| [32] | Priority | Aug. 27, 1968 |
| [33] | | Germany |
| [31] | | P 17 81 120.0 |

[54] AIR FREIGHT INSTALLATION WITH ARTICLE HANDLING AND STORAGE MEANS
15 Claims, 8 Drawing Figs.

[52] U.S. Cl. .................................................. 214/16.4, 214/38
[51] Int. Cl. ............................................. B65g 1/06
[50] Field of Search ........................................... 214/16 (B), 16.4, 16.42

[56] References Cited
UNITED STATES PATENTS

| 3,260,349 | 7/1966 | Vander Meer | 214/11X |
| 3,351,219 | 11/1967 | Ruderfer | 214/16.4 |
| 3,434,604 | 3/1969 | Haldimann et al. | 214/16.4 |
| 3,511,372 | 5/1970 | Kantarian | 214/11X |

Primary Examiner—Gerald M. Forlenza
Assistant Examiner—Raymond B. Johnson
Attorney—Walter Becker ABSTRACT: The invention pertains to transloading of air freight in which, adjacent to a ramp area for planes, is a building having a truck dock on the side opposite the ramp area. Within the building are conveyors and shelf means, preferably roller shelf means, for transporting and supporting the goods during transfer thereof between planes and between planes and trucks. The conveyors provide for lateral and vertical movement of the goods while the shelf means, and which are distributed laterally and vertically and extend in the direction from the ramp area to the dock, provide for horizontal movement of the goods between the truck dock and the ramp area.

AIR FREIGHT INSTALLATION WITH ARTICLE HANDLING AND STORAGE MEANS

The present invention relates to an air freight transloading installation in connection with a piece goods sorting installation.

In view of the considerable increase in the air freight traffic to be expected in the next few years it has been given serious thought how to make the transloading of piece goods with containers or other loading units between various airplanes and between airplanes and transporting vehicles as economical as possible.

It is an object of the present invention to provide an air freight transloading installation with sorting means which will make the transloading and transporting of individual pieces or goods economical while taking into consideration future developments and increases in the air freight traffic.

This object and other objects and advantages of the invention will appear more clearly from the following specification in connection with the accompanying drawings, in which:

FIGS. 1—7 illustrate a top view of an air freight transloading station with a view into the first floor (FIGS. 1, 3 and 7) and into the top floor (FIGS. 2, 4, 5 and 6) of a two-story building of an installation according to the invention with different paths for the loading units and the piece goods.

Figure 8:
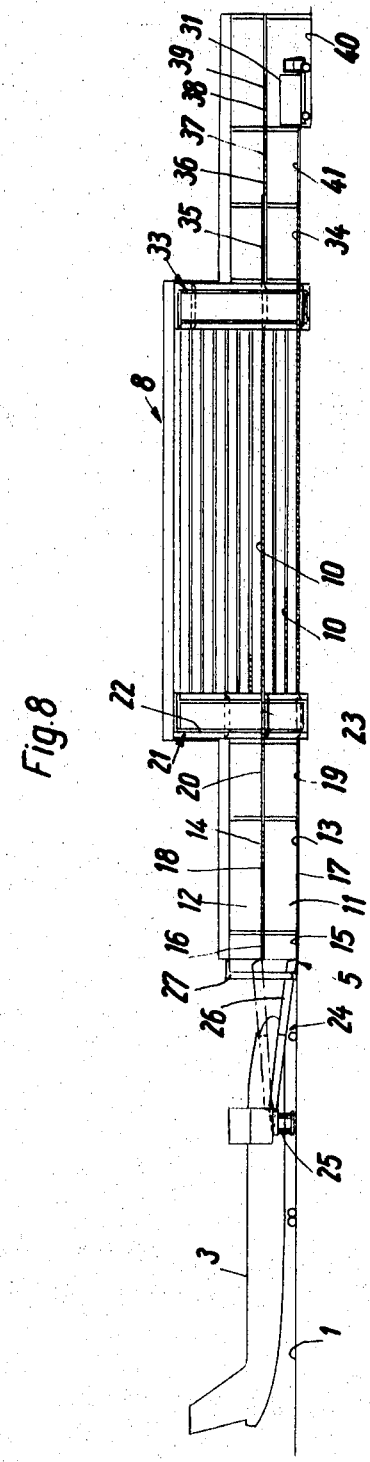

FIG. 8 represents a cross section through the transloading installation according to the invention, said section being taken along the line VIII-VIII of FIG. 1.

The invention is seen primarily in that adjacent an apron which is equipped with handling installations for airplanes, the following installations are arranged adjacent to each other: a sorting installation, a system of shelves, a further sorting installation, and a truck servicing station, while each of the two sorting installations comprises a plurality of rows of waiting areas and packing areas with transporting sections for oppositely moving feeding devices or conveyors, and a distributing installation between the packing areas and the shelves.

Preferably, the system of shelves comprises two groups of shelves for conveying directions which are opposite to each other. Each group may consist of adjacent shelves with superimposed shelf compartments which form horizontal layers in the group. Advantageously, the sorting installations have two stories.

Referring now to the drawings in detail, an apron 1 forms the parking areas for the cargo planes, for instance, an intercontinental airplane 2 and the domestic airplanes 3 and 4. The airplanes are parked with their longitudinal axes parallel to each other so that their bow faces the border line 5 between the apron 1 and the remaining area of the transloading installation.

On the area adjacent the apron 1, opposite the parking area for the intercontinental airplane 2 there is provided a sorting installation 6 for loading units which permits the transfer of loading units, for instance, containers or palettes, from the airplanes to trucks and vice versa without sorting the piece goods. For sorting the piece goods, there is employed an installation which will presently be described and which is located on that area which lies adjacent the apron 1 and is located opposite the parking area for the domestic airplane 3.

This sorting installation has a complex of long passing shelves 8, 9 with a direction of passing of the goods over said shelves being at a right angle to the border line 5 of the apron, in other words being parallel to the longitudinal axes of the airplanes 2, 3 and 4. There are provided two adjacent groups of such passing shelves for opposite passing directions. The passing shelves 8 of one group are intended for the movement of piece goods in the direction away from the apron 1, and the passing shelves 9 of the other group are intended for the movement of the piece goods toward the apron 1. Each group consists, for instance, of ten adjacent passing shelves 8, 9 and each of these shelves has, for instance, ten superimposed compartments of substantially the same dimensions. Correspondingly, the shelf groups consist, for instance, of ten superimposed horizontal layers of shelf compartments. The bottoms of these compartments are formed by driven rollers 10 as shown in FIG. *$.

Between the border line 5 of the apron 1 and the passing shelves 8, 9 there is provided a two-story sorting installation which comprises waiting areas 11, 12, packing areas 13, 14, transport sections 15, 16, 17 and 18 and a distributing installation provided between the packing areas 13, 14 and the passing shelves 8, 9. The lower floor of the sorting installation is located at the same level as the apron 1.

The waiting areas 11, 12 are arranged in two rows one above the other and in slightly spaced relationship to the border line 5 of the apron 1. These rows extend at both sides beyond the width of the complex of passing shelves 8, 9. On one side these rows extend up to the parking place of the airplane 4. Each waiting area 11, 12 has a roller conveyor for a direction of movement at a right angle with regard to the border line 5.

Between the waiting areas 11, 12 and the border line 5 of the apron 1, on both floors there are provided in superimposed arrangement two transporting sections 15 and 16 which cover such a length that they extend from the parking place of the intercontinental airplane 2 to the parking place of the domestic airplane 3. These transporting sections 15 and 16 include roller conveyors for a direction of movement from the intercontinental airplane 2 to the parking place of the domestic airplane 3. These transporting sections 15 and 16 include roller conveyors for a direction of movement from the intercontinental airplane 2 to the two other airplanes.

Parallel to the said transport sections 15 and 16 in the two floors there are arranged in superimposed arrangement transport sections 17 and 18 which are provided with roller conveyors for conveying in opposite direction. Adjacent said transport sections 17, 18 there are arranged in superimposed position in two floors the packing areas 13, 14 forming two rows extending over the width of the complex of the passing shelves 8, 9. Each packing area 13, 14 is in alignment with a passing shelf complex and has a roller conveyor for a direction of movement at a right angle with regard to the border line 5.

The distributing installation comprises junction conveyor sections 19, 20 which are arranged on the two floors in superimposed position so as to be in alignment with the packing areas 13, 14 and are likewise provided with roller conveyors. The distributing installation furthermore comprises a crane mounting 21 which extends between the junction conveying sections 19, 20 and the complex of passing shelves 8, 9.

The crane mounting 21 has two frame works 22 which are displaceable at the end face of the complex of passing shelves. In each frame work 22 there is provided a platform 23 which is equipped with a roller conveyor and is adapted to be raised and lowered in such a way that it can selectively be brought into positions in which the roller conveyor thereof is in alignment with the roller conveyor of one of the junction conveyor sections 19 and/or with one of the roller conveyors 10 of the shelf compartments. The transfer of loading units, for instance containers or palettes, from the airplane on the apron 1, especially from the domestic airplanes 3, 4, to the transporting sections 15, 16 is effected by means of handling devices 24 handling the goods on the apron. Each of these devices has a frame work 25 (FIG. 8) which is adjustable as to height and is displaceable on the apron 1, preferably by means of air cushions, and is furthermore adapted to be moved to a loading hatch in an airplane. Adjacent the framework 25 there is provided a bridge 26 the length of which can be varied telescopically. That end of this bridge which is remote from the frame work 25 is displaceable in a frame 27 which is movable along the border line 5 of the apron and can be lifted and lowered in such a way that it can selectively be moved into the positions shown in FIG. 8. Accordingly, the bridge 26 can be connected selectively either to the transport section 15 or to the transport section 16.

This connection of the intercontinental airplane 2 with the lower transport sections 15, 17 is effected, as shown for instance in FIG. 1, by means of conveyors 28 extending transverse to the fuselage of the airplane and by means of adjacent conveyors 29 extending at a right angle to the conveyors 28. By means of an intermediate conveyor 29 connected to the bow of the airplane, the intercontinental airplane 2 is, as will be evident from FIG. 2, connected to the upper transport sections 16, 18.

When viewed from the apron 1, behind the passing shelves 8, 9 there is provided a handling area 30 for trucks 31, 32. Between this area and the passing shelves there is provided a further sorting installation. This sorting installation comprises a distributing installation which includes a crane mounting 33 similar to the crane mounting 21 and also comprises junction conveying sections 34, 35 located on two floors in superimposed arrangement similar to the junction conveyor sections 19,.

The upper junction conveyor sections 35 are followed by a series of packing areas 36 which correspond to the packing areas 14. Adjacent thereto is a transporting section 37, a series of waiting areas 38 and a transport section 39 arranged as an image to the transport section 18, the waiting areas 12, and the transporting section 16. The transport sections 37, 39 are in conformity with the arrows shown, for instance, in FIG. 2, designed for conveying directions which are opposite with regard to each other.

Below the transport section 39 and the waiting areas 38 there is provided an area 40 for parking the trucks 31, 32. This area 40 is located somewhat lower than the level of the apron 1 and of the lower junction conveyor section 35 and an adjacent area 41 so that a loading ramp is formed.

The transport sections 16, 18 and 37, 39 which are located in the upper floors of the two sorting installations are interconnected by two transport sections 42, 43 for opposite conveying directions, said transport sections 42, 43 being located adjacent the complex of the passing shelves.

FIG. 1 illustrates the transfer of the freight from the domestic airplane 3 to the truck 31, 32 and vice versa via sorting installations and passing shelves. Loading units, for instance containers, filled with piece goods or palettes loaded with piece goods are, in conformity with the dash line, by means of a handling device 24 on the lower floor conveyed from the airplane 3 to packing areas 13 which are located opposite to the shelves 8. The distribution of the loading units in a direction transverse to the passing direction is effected by means of the transporting sections 15, 17. If not sufficient packing area 13 is available, the loading units are first unloaded onto waiting areas 11. From the load carriers on the packing areas 13, the freight is manually or when heavier freight is involved by means of fixedly installed translatively displaceable lifter forks, placed upon the adjacent junction conveyor sections 19. The freight is by packers marked and presorted in such a way that by means of the crane installation 21 the freight pieces can in groups, in conformity with a preconceived plan be moved to certain compartments of the shelves 8. This is brought about by correspondingly moving the frame work 22 and lifting or lowering the platform 23. By means of the roller conveyors 10 in the shelf compartments the freight pieces are displaced as far as possible until they are piled up on the oppositely located end face of the compartments.

From the shelves 8, the freight pieces are by means of the crane installation 33, in conformity with a preconceived plan, conveyed to trucks, for instance truck 31, via the respective junction conveyor sections. One of the dotted lines in FIG. 1 indicates one of the paths over which the freight pieces may be moved from one packing area 13 to a truck 31. The other dotted line in FIG. 1 illustrates that piece goods which have been transported by truck 32 are distributed by means of one of the junction conveyor sections 34 and the crane installation 32 over compartments of the shelves 9. This division and withdrawal of the freight pieces from the shelf compartments by means of the crane installation 21 is effected in conformity with a preconceived plan. The freight pieces are packed in load carriers which are located on packing areas 13, and the completed loading units are, in conformity with the respective dash lines, moved via the handling device at the apron to the airplane 3. Also in this instance, if desired, loading units may be deposited on waiting areas 11.

Figure 2:
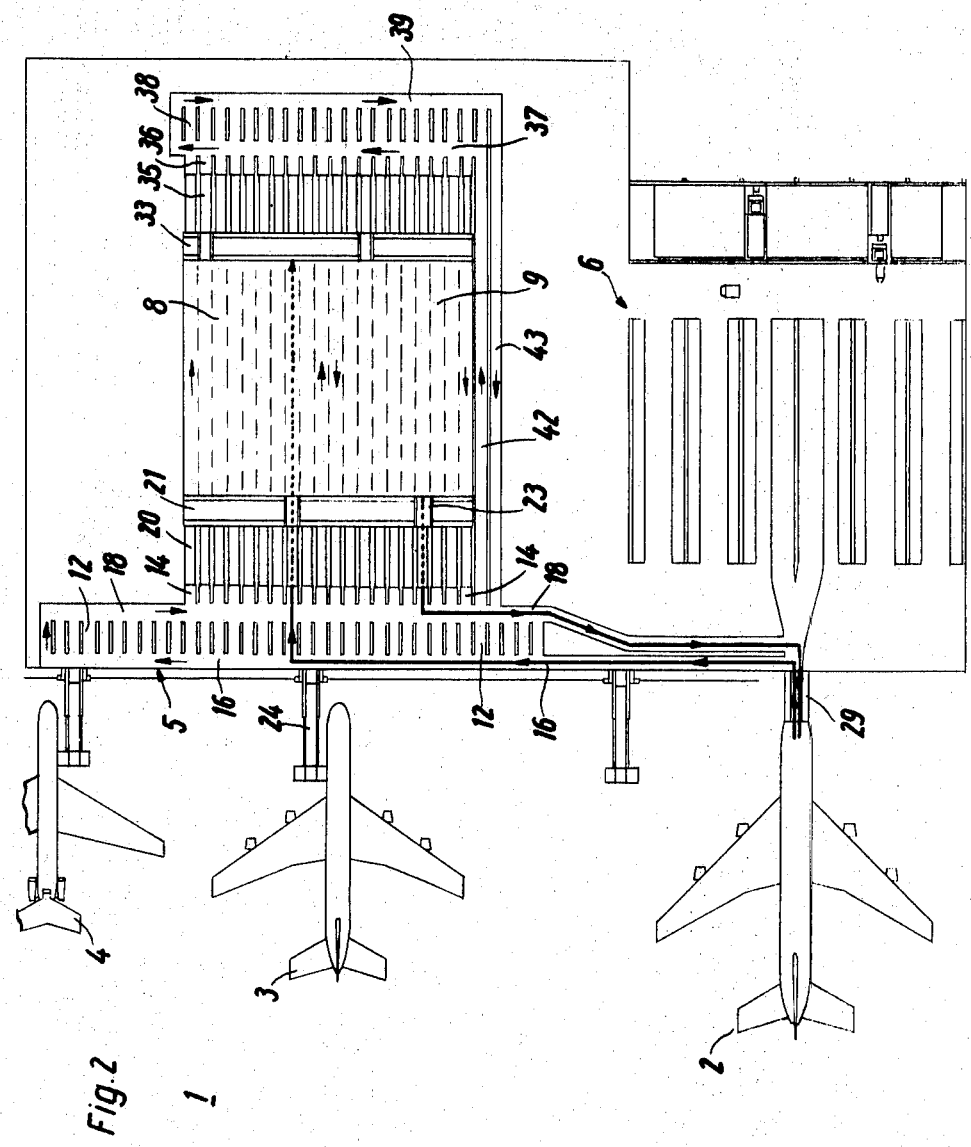
Figure 3:
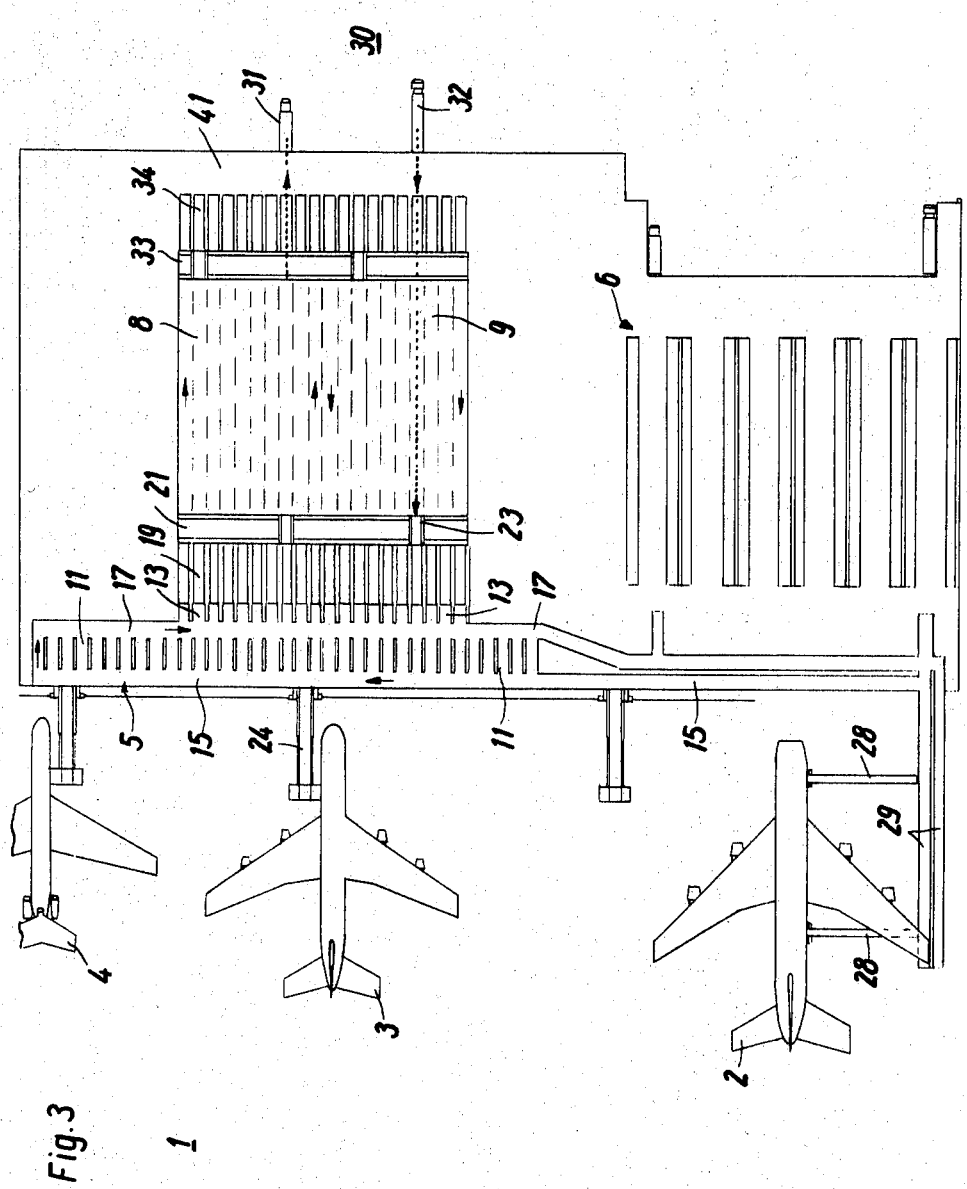

FIGS. 2 and 3 illustrate the transfer of freight from the intercontinental airplane 2 to the trucks 31, 32 and vice versa.

In conformity with FIG. 2, the loading units are from the bow of the airplane 2 in conformity with one of the solid lines placed via intermediate conveyors 29 onto the transport section 16 on the upper floor. From here the loading units pass to the packing areas 14, if necessary, after they have been temporarily deposited onto one of the waiting areas 12. The unpacked goods are by means of the junction conveyor sections 20 and the crane installation 21 distributed over the compartments of the passing shelves 8. FIG. 3 illustrates how on the lower floor, the piece goods withdrawn by the crane installation 33 from the compartments of the shelves 8 in conformity with a preconceived plan are moved via transfer conveyor sections 34 to the trucks, for instance truck 31.

Furthermore, FIG. 3, in conformity with FIG. 1, illustrates how the freight goods delivered by the trucks, for instance truck 32, are distributed to the compartments of the shelves 9. In conformity with FIG. 2, the goods are, in conformity with a preconceived plan, withdrawn from the compartments by the crane installation 21 and are moved to the load carriers on the packing areas 14. When these load carriers are filled with goods, they are loaded via the transporting section 18, in conformity with the respective full line of FIG. 2, onto the intercontinental airplane 2.

In this connection it is important that when loading the goods onto the passing shelves and when withdrawing the goods from the shelves, care is taken that the respective freight piece which was first loaded into the compartment will also first be withdrawn from the compartment, in other words the principle prevails "first in — first out".

Figure 4:
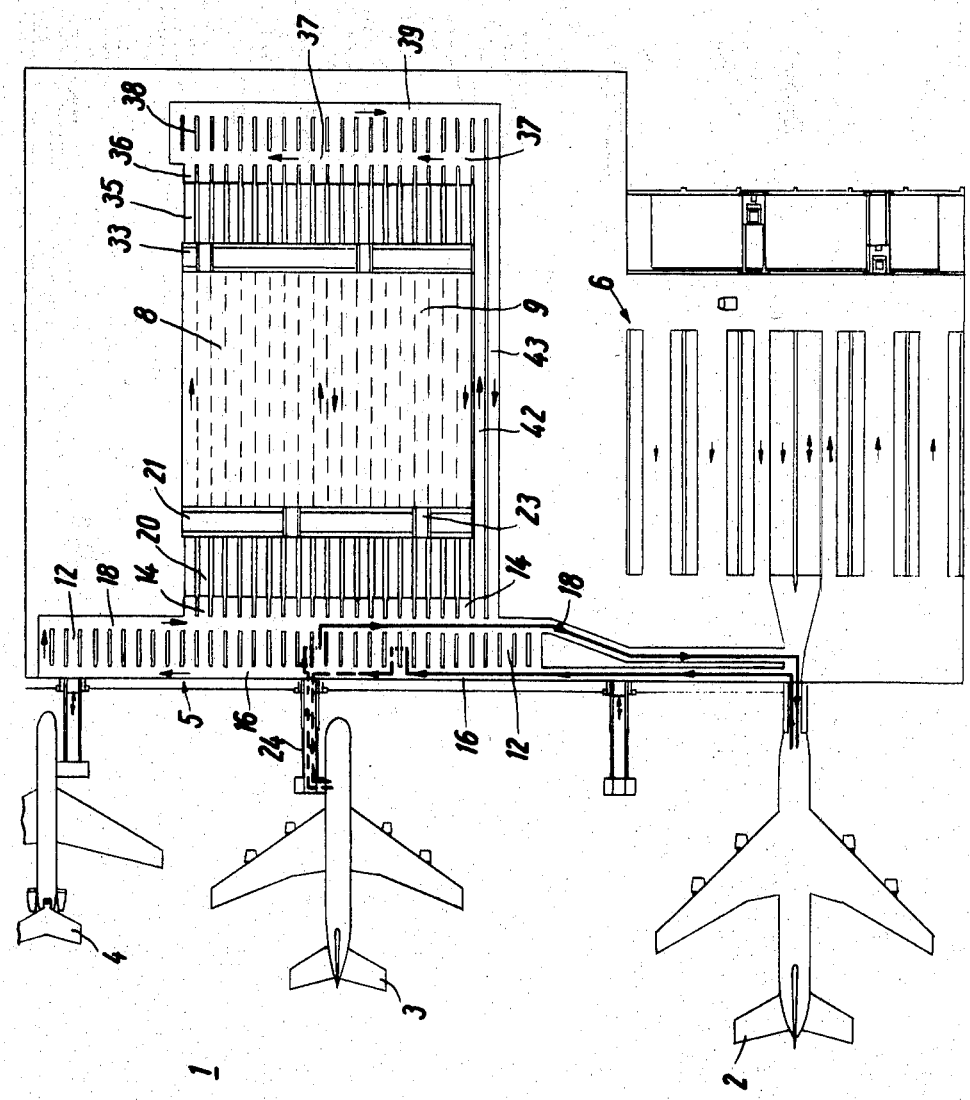
Figure 5:
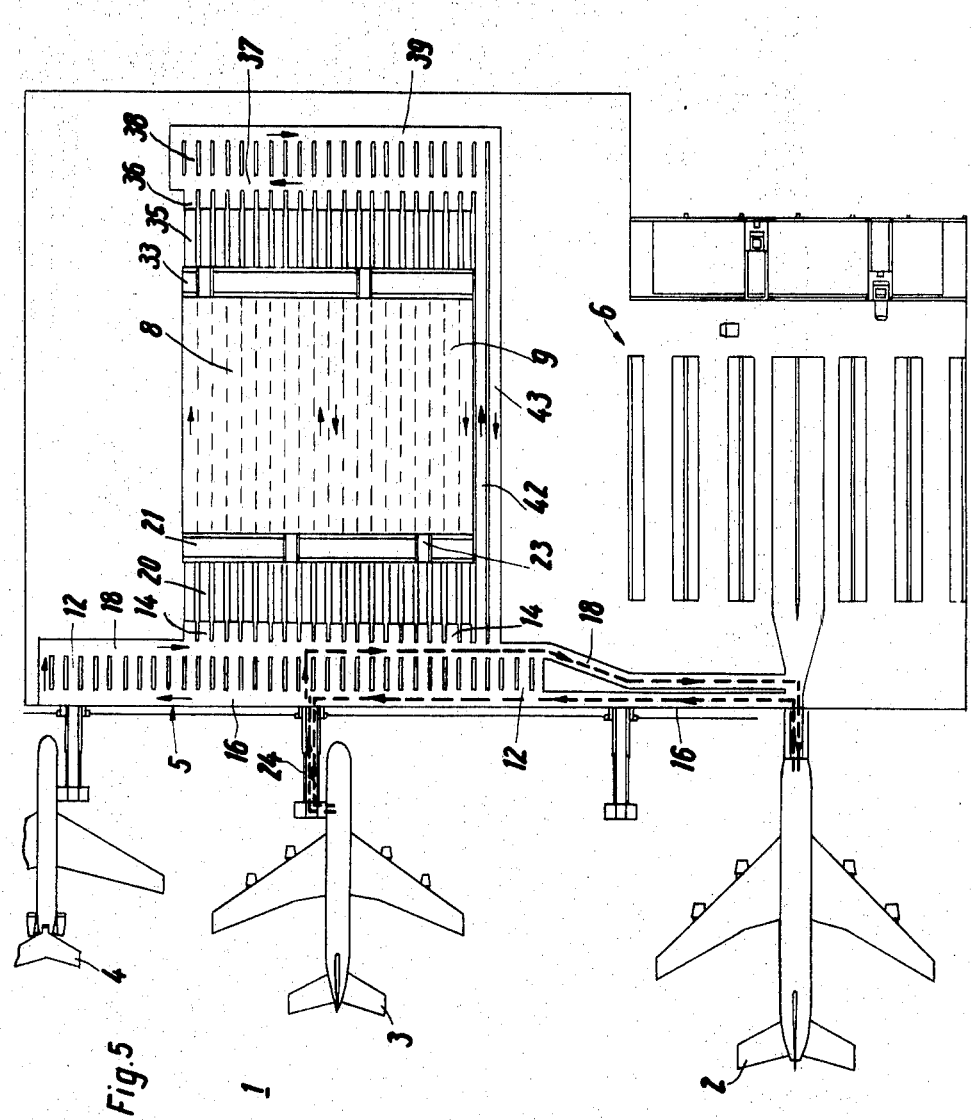

FIGS. 4 and 5 illustrate how the freight is passed from the intercontinental airplane 2 to the domestic airplane 3 and vice versa and, more specifically, without the necessity of sorting the freight pieces. To this end, in both instances there are provided the transport sections 16, 18 on the upper floor.

According to FIG. 4, an unpacking and repacking of the piece goods from one load carrier to another is effected in conformity with FIG. 1 by depositing a container first onto one of the waiting areas 12, said container being transferred from the intercontinental airplane 2, according to the full line of FIG. 4, onto the transport area 16. Here the contents of the container is, in conformity with the short dotted line in FIG. 4, transferred for instance onto a palette which is located on an adjacent waiting area 12. The finish packed palette is then in conformity with one of the dash lines in FIG. 4 moved into the hull of the domestic airplane 3 by means of a transport section 16 and a handling device 24.

FIG. 4 also illustrates how loaded palettes are moved from the airplane 3, in conformity with the dash line, onto one of the waiting areas 12. Here the goods are, in conformity with the shown dots, packed into one of the containers located on an adjacent waiting area. This container is then by means of the transporting section 14 moved into the hull of the intercontinental airplane 2 in conformity with the solid line.

FIG. 5 illustrates that in conformity with the dash lines, load units can without unpacking and repacking be transferred from one airplane into the other by means of the transporting sections 14, 16.

Figure 6:
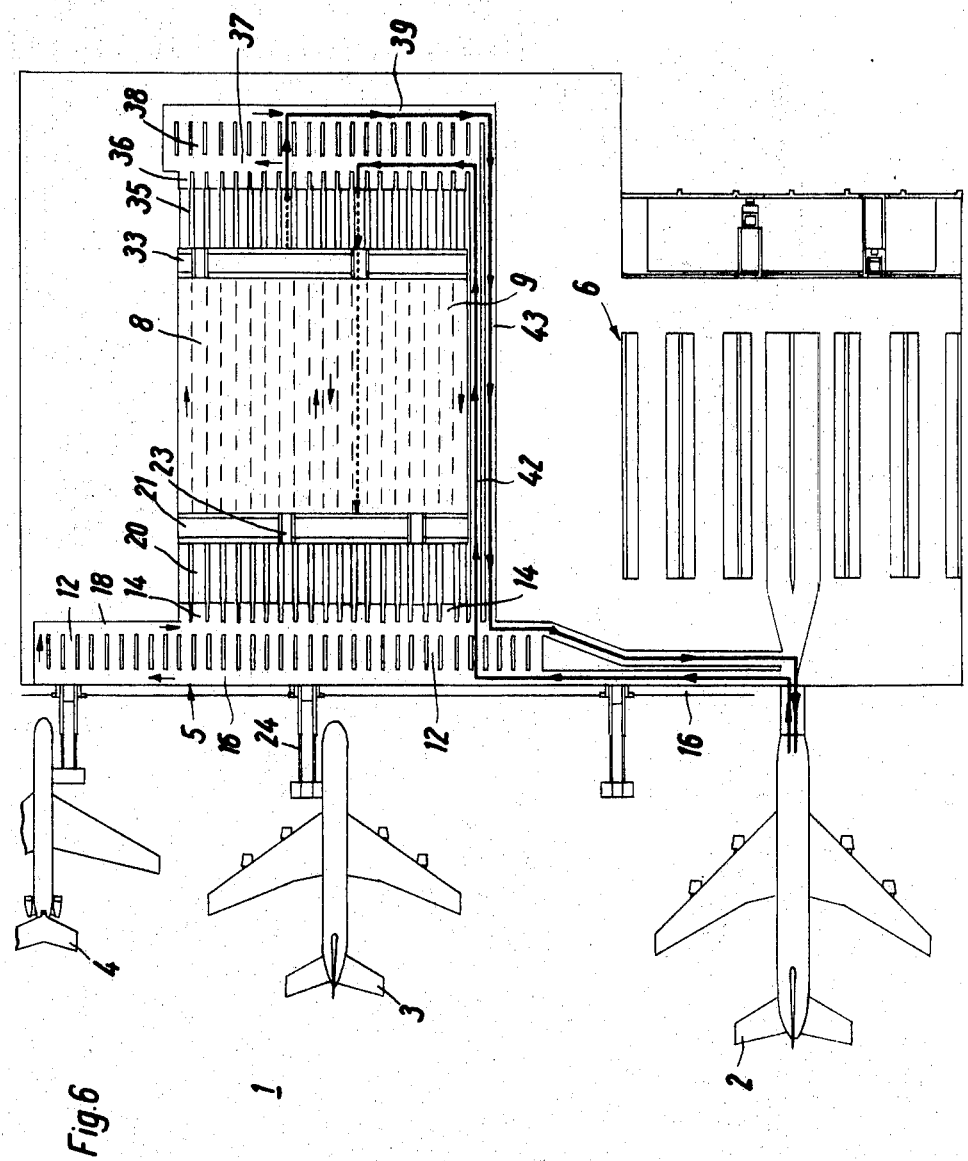
Figure 7:
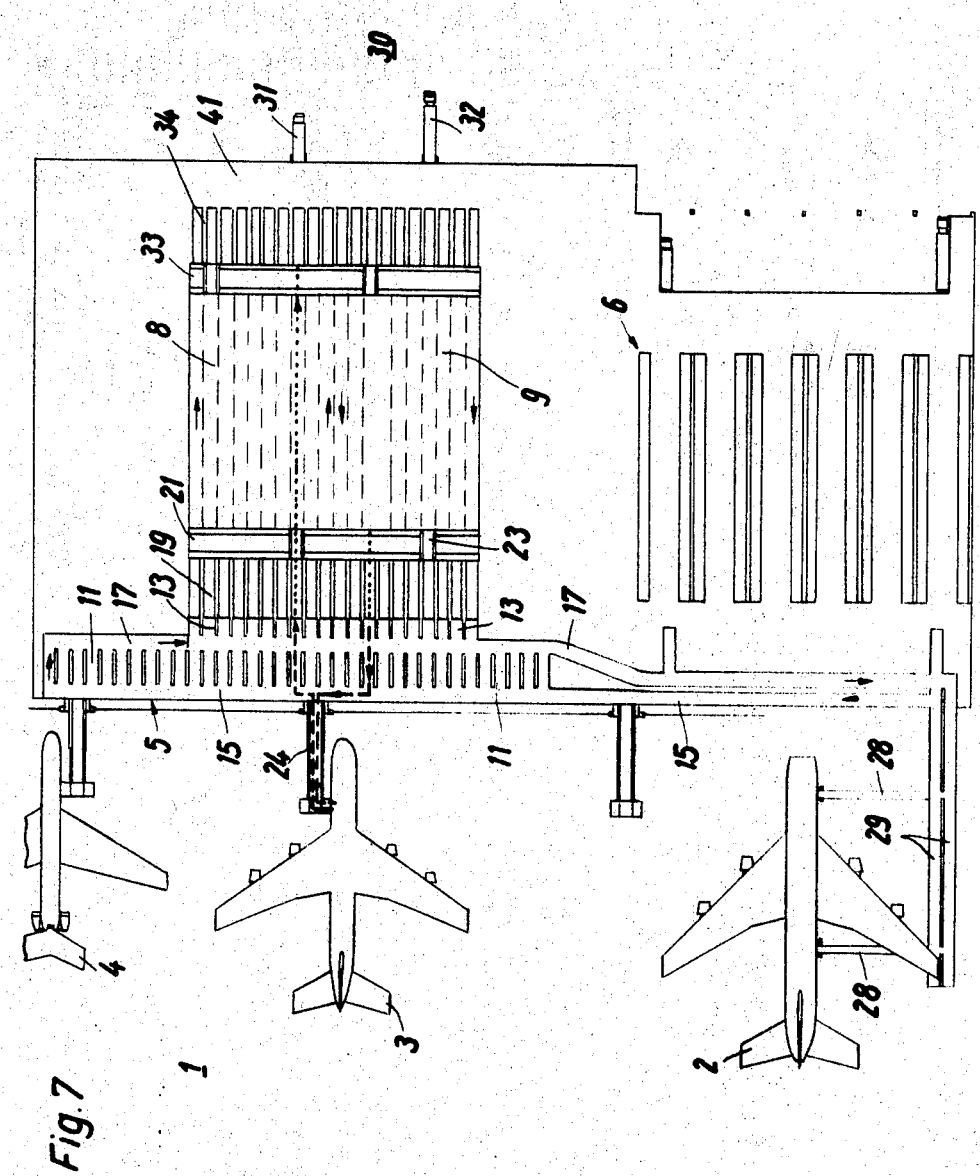

FIGS. 6 and 7 illustrate how freight can be transferred from one airplane to another with interposed sorting arrangement. The containers leaving the intercontinental airplane 2 are, in conformity with one of the solid lines, moved over the transporting section 16 in the upper floor and to the waiting areas 12 of the transporting section 42. From here the containers move to the transporting section 37 on that side of the passing shelves which faces away from the apron 1. The containers are then conveyed to packing areas 36. The piece goods unpacked on said packing areas 36 pass via the respective junction conveyor sections 35 to the crane installation 33 which distributes the goods in conformity with a preconceived plan to the compartments of the passing shelves 9.

FIG. 7 shows how from these compartments on the lower floor by means of the crane installation 21, the piece goods are, in conformity with a preconceived plan, moved via junction sections 19 to load carriers which are located on the packing areas 13. The finish packed load units are then, in conformity with one of the dash lines of FIG. 7, moved to a domestic airplane 3, and, if necessary, deposited on waiting areas 11.

FIG. 7 furthermore illustrates how loading unit are from the domestic airplane 3 moves to the packing area 13 in conformity with the respective dash line and how the piece goods are, in conformity with the respective dotted line, distributed to the compartments of the shelves 8. From here, as indicated in FIG. 6, the piece goods are, in conformity with a preconceived distributing plan moved to to the load carriers on the packing areas 36 and the finish packed load units pass in conformity with the respective solid line via transporting sections 39, 43 and 18 into the intercontinental airplane 2.

As will be seen from the preceding description, an airfreight transloading station according to the present invention is characterized by a compact space saving outlay and by a fast and efficient transport system. It will also be evident that the individual moving operations can be automated in conformity with preconceived programs. Moreover, an overlapping of the transporting paths will be avoided.

In some instances, it may be advantageous to arrange the passing shelves not too close adjacent to each other but spaced from each other to such an extent that if necessary individual piece goods can be withdrawn from the center of a shelf compartment. In some instances it may become necessary that the principle "first in — first out" is not followed in view of the fact that some of the goods have to be handled with preference.

The distributing installations between the sorting installation and the passing shelves may also be designed differently from the illustrated arrangements which comprise the transfer conveying sections 20, 19, 35 and the crane installations 21, 33. In such an instance, for purposes of distributing the freight pieces which are withdrawn from the load carriers on the packing areas, it is possible to employ annular conveying paths, which lead to the passing shelves and vice versa, in connection with lifting devices.

It is, of course, to be understood that the present invention is, by no means, limited to the particular arrangement shown in the drawings but also comprises any modifications within the scope of the appended claims.

We claim:

1. An installation for handling air freight goods during the transfer thereof between planes and between trucks and planes and permitting sorting, packing, unpacking and storage of the goods during the handling, said installation comprising: an apron area on which planes can be parked and a truck parking area spaced in a certain direction from said apron area, a plurality of laterally distributed passing shelf means in the region between said areas extending parallel to said certain direction and operable for passing goods in opposite directions, a plurality of laterally distributed holding shelf means for goods adjacent each area extending parallel to said certain direction for receiving and holding goods, first conveyor means at the end of each said holding shelf means remote from the respective area for receiving goods from and supplying goods to said holding shelf means and for conveying the goods in one direction laterally to said certain direction, second conveyor means at the other end of said holding shelf means for also receiving goods from and supplying goods to said holding shelf means and for conveying the goods in the direction opposite to said first direction and laterally to said certain direction, a plurality of laterally distributed packing shelf means on the side of each first conveyor means opposite said holding shelf means for receiving goods from and supplying goods to said first conveyor means and extending parallel to said certain direction, and distributor means between each packing shelf means and the adjacent end of said passing shelf means for receiving goods from and supplying goods to said packing shelf means and said passing shelf means and for conveying the goods in opposite directions laterally to said certain direction.

2. An installation according to claim 1, in which said passing shelf means comprises a first group of shelf means operable for moving goods in one direction and a second group of shelf means operable for moving goods in the opposite direction.

3. An installation according to claim 2, in which each said groups of said passing shelf means comprises a plurality of shelves distributed vertically at respective levels.

4. An installation according to claim 3, in which said shelves are spaced laterally to provide access thereto for the selective removal of goods therefrom if necessary.

5. An installation according to claim 1, in which each of said packing shelf means and said holding shelf means are distributed in two vertically spaced levels.

6. An installation according to claim 5, in which at least the said second conveyor means adjacent said apron area comprises a conveyor at each of said two vertically spaced levels.

7. An installation according to claim 1, which includes third conveyor means extending from said second conveyor means adjacent said apron area out into said apron area for conveying goods between planes and the said second conveyor means adjacent said apron area.

8. An installation according to claim 7, in which the end of said third conveyor means nearest the adjacent said second conveyor means is adjustable for registration with either of the vertically spaced conveyors of the said second conveyor means.

9. An installation according to claim 6, in which said first and second conveyor means nearest said apron area extend laterally a substantial distance beyond at least one lateral limit of the adjacent holding shelf means for conveying goods to and from a lateral region of the apron area which is spaced laterally from the region of the apron area adjacent the holding shelf means.

10. An installation according to claim 3, in which the said distributor means at each end of said passing shelf means comprises conveyor elements for receiving goods and moveable laterally and vertically for registration with the shelves of said passing shelf means and with the adjacent said packing shelf means.

11. An installation according to claim 10, which includes a pair of further conveyors extending in said certain direction between said packing shelf means in bypassing relation to said passing shelf means and running in respectively opposite directions for the rapid movement of goods between said packing shelf means.

12. An installation according to claim 10, in which said distributor means includes conveying sections interposed between said packing shelf means and said conveyor elements for the movement of goods in said certain direction between the said conveyor elements and the adjacent packing shelf means.

13. An installation according to claim 10, which includes a frame at each end of said passing shelf means, each said conveyor elements being vertically and laterally moveably supported in a respective said frame.

14. An installation according to claim 9, which includes a further parking area spaced from said lateral region of said apron area in said certain direction, and goods transporting means extending between said further parking area and said lateral region of said ramp area.

15. An installation according to claim 1, in which said passing shelf means are power operated for moving goods supplied thereto from one end thereof to the other, said conveyor means also being power operated, and said distributor means including power operated components.